(12) United States Patent
Wu

(10) Patent No.: US 7,178,483 B2
(45) Date of Patent: Feb. 20, 2007

(54) INFLATABLE PET HOUSE MODULE

(76) Inventor: Hsin-Tsai Wu, 1F, No. 19, Alley 3, Lane 106, Sec. 3, Min-Chuan E. Rd., Taipei City (TW)

( * ) Notice: Subject to any disclaimer, the term of this patent is extended or adjusted under 35 U.S.C. 154(b) by 0 days.

(21) Appl. No.: 11/134,000

(22) Filed: May 20, 2005

(65) Prior Publication Data

US 2006/0260558 A1 Nov. 23, 2006

(51) Int. Cl.
*A01K 1/00* (2006.01)
*E04H 15/00* (2006.01)
*E04H 15/48* (2006.01)

(52) U.S. Cl. .................. 119/498; 135/87; 135/128; 135/143

(58) Field of Classification Search ............. 119/498, 119/453, 474, 496, 482, 497, 499; 135/87, 135/95, 96, 121, 125, 128, 143; 5/121, 122, 5/127, 128
See application file for complete search history.

(56) References Cited

U.S. PATENT DOCUMENTS

| | | | | | |
|---|---|---|---|---|---|
| 2,754,836 | A | * | 7/1956 | Darby ........................ | 52/2.21 |
| 2,819,724 | A | * | 1/1958 | Barker ....................... | 52/2.18 |
| 2,830,606 | A | * | 4/1958 | Daugherty ................. | 52/2.19 |
| 3,148,662 | A | * | 9/1964 | Morrell ...................... | 52/2.17 |
| 3,247,627 | A | * | 4/1966 | Bird ........................... | 52/2.19 |
| 3,457,684 | A | * | 7/1969 | Wood, Jr. ................... | 52/2.21 |
| D225,121 | S | * | 11/1972 | Mashburn .................. | D30/108 |
| 3,999,333 | A | * | 12/1976 | Amarantos .................. | 52/2.19 |
| 4,000,585 | A | * | 1/1977 | Denaro ....................... | 52/2.17 |
| 4,000,749 | A | * | 1/1977 | Busco ......................... | 600/21 |
| 4,085,762 | A | * | 4/1978 | O'Brian et al. ............. | 52/71 |
| 4,103,369 | A | * | 8/1978 | Riordan ..................... | 52/2.14 |
| 4,335,545 | A | * | 6/1982 | Couch ........................ | 52/2.19 |
| 4,384,435 | A | * | 5/1983 | Polise et al. ................ | 52/2.19 |
| 4,576,116 | A | * | 3/1986 | Binkert ...................... | 119/498 |
| 4,607,655 | A | * | 8/1986 | Wagner et al. ............. | 52/2.19 |
| D285,880 | S | * | 9/1986 | Griesenbeck ............... | D21/838 |
| 4,629,182 | A | * | 12/1986 | Rader et al. ................ | 482/35 |
| 4,631,873 | A | * | 12/1986 | Parish ........................ | 52/2.21 |
| 4,787,335 | A | * | 11/1988 | Carlyon ..................... | 119/170 |
| 4,942,845 | A | * | 7/1990 | Lane .......................... | 119/52.2 |
| 5,007,212 | A | * | 4/1991 | Fritts et al. ................. | 52/2.18 |
| 5,050,536 | A | * | 9/1991 | Baker ......................... | 119/499 |
| D327,340 | S | * | 6/1992 | Barreto et al. ............. | D30/118 |
| D327,341 | S | * | 6/1992 | Barreto et al. ............. | D30/118 |
| 5,351,646 | A | * | 10/1994 | Zoroufy ..................... | 119/497 |
| 5,487,400 | A | * | 1/1996 | Dawkins .................... | 135/87 |
| D371,415 | S | * | 7/1996 | Fernandes, Sr. ........... | D21/838 |
| 5,570,544 | A | * | 11/1996 | Hale et al. .................. | 52/2.18 |
| 5,586,594 | A | * | 12/1996 | Shapoff ...................... | 160/135 |
| 5,813,172 | A | * | 9/1998 | McNally .................... | 52/2.25 |
| 5,893,238 | A | * | 4/1999 | Peacock et al. ............ | 52/2.18 |

(Continued)

*Primary Examiner*—Yvonne R. Abbott
(74) *Attorney, Agent, or Firm*—Trop, Pruner & Hu, P.C.

(57) ABSTRACT

An inflatable pet house module includes first and second inflatable units. The first inflatable unit includes an inflatable mattress and a mattress cover formed with an opening for insertion of the mattress thereinto. The second inflatable unit is coupled releasably to the first inflatable unit by a coupling unit, and includes an inflatable canopy body and a canopy cover formed with an opening for insertion of the canopy body thereinto. The canopy body has a middle portion provided with a middle heat-seal line unit to partition the canopy body into two canopy sections. The canopy body is bendable along the middle heat-seal line unit when inflated so as to place the canopy body in a standing position where the middle portion is propped up by the canopy sections to thereby enable the first and second inflatable units to cooperatively define a chamber.

9 Claims, 4 Drawing Sheets

U.S. PATENT DOCUMENTS

| | | | |
|---|---|---|---|
| 5,987,822 A * | 11/1999 | McNiff et al. | 52/2.11 |
| 6,209,150 B1 * | 4/2001 | Hsu et al. | 4/506 |
| 6,325,086 B1 * | 12/2001 | Shinner et al. | 135/126 |
| 6,332,290 B1 * | 12/2001 | Delamare | 52/2.22 |
| 6,354,245 B1 * | 3/2002 | Roddy et al. | 119/453 |
| 6,679,007 B1 * | 1/2004 | Minchew et al. | 52/2.11 |
| 6,708,451 B2 * | 3/2004 | Gomes | 52/2.17 |
| 6,722,084 B2 * | 4/2004 | Berman | 52/2.11 |
| 6,810,896 B2 * | 11/2004 | Ueda et al. | 135/136 |
| 6,901,940 B2 * | 6/2005 | Zheng | 135/126 |
| 6,929,016 B2 * | 8/2005 | Lee | 135/126 |
| D510,119 S * | 9/2005 | Brock | D21/835 |
| 6,966,275 B2 * | 11/2005 | Whitehill | 119/28.5 |
| 2002/0162584 A1 * | 11/2002 | Berman | 135/126 |
| 2004/0139997 A1 * | 7/2004 | Zheng | 135/126 |

* cited by examiner

INFLATABLE PET HOUSE MODULE

BACKGROUND OF THE INVENTION

1. Field of the Invention

The invention relates to a pet house, more particularly to an inflatable pet house module which can be assembled and carried conveniently, and which has a replaceable cover.

2. Description of the Related Art

Many people keep pets for company. Pets, like dogs, usually sleep in dog houses. Conventional dog houses are generally made from relatively hard wooden or metal material, and are usually monotonous in appearance. Besides, most of the conventional dog houses are not detachable or collapsible. If the owner wishes to take his/her dog on an excursion or camping trip, space for the dog house would be a problem.

SUMMARY OF THE INVENTION

Therefore, an object of the present invention is to provide an inflatable pet house module that is collapsible to facilitate carrying outdoors on an excursion, that is convenient to assemble, and that has a replaceable cover.

Accordingly, an inflatable pet house module of this invention includes first and second inflatable units, and a coupling unit. The first inflatable unit is adapted to be placed on a ground surface, and includes an inflatable mattress confining a first air inflatable space therein and provided with a first valve member for inflating and deflating the inflatable mattress, and a mattress cover confining a first receiving space for accommodating the inflatable mattress therein and formed with a first access opening communicated with the first receiving space such that the inflatable mattress is insertable into the first receiving space through the first access opening. The mattress cover has two first lateral edges opposite to each other in a longitudinal direction and spaced apart from each other by a first distance. The second inflatable unit is coupled releasably to the first inflatable unit, and includes an inflatable canopy body confining a second air inflatable space therein, provided with a second valve member for inflating and deflating the inflatable canopy body, and having two longitudinal edges opposite to each other in a transverse direction, and a middle portion having a middle heat-seal line unit that extends between the longitudinal edges in the transverse direction so as to partition the inflatable canopy body into two canopy sections to thereby configure the second air inflatable space into two intercommunicated air inflatable regions, and a canopy cover confining a second receiving space for receiving the inflatable canopy body therein and formed with a second access opening communicated with the second receiving space such that the inflatable canopy body is insertable into the second receiving space through the second access opening. The canopy cover has two second lateral edges opposite to each other in the longitudinal direction and spaced apart from each other by a second distance. The second distance is greater than the first distance. The coupling unit couples releasably the second lateral edges of the canopy cover to the first lateral edges of the mattress cover such that the inflatable canopy body is bendable along the middle heat-seal line unit when inflated so as to place the inflatable canopy body in a standing position where the middle portion is propped up by the canopy sections to thereby enable the first and second inflatable units to cooperatively define a chamber that has two open ends opposite to each other in the transverse direction. The coupling unit includes a plurality of first connecting members provided respectively on the first lateral edges of the mattress cover, and a plurality of second connecting members provided respectively on the second lateral edges of the canopy cover to engage removably and respectively the first connecting members.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
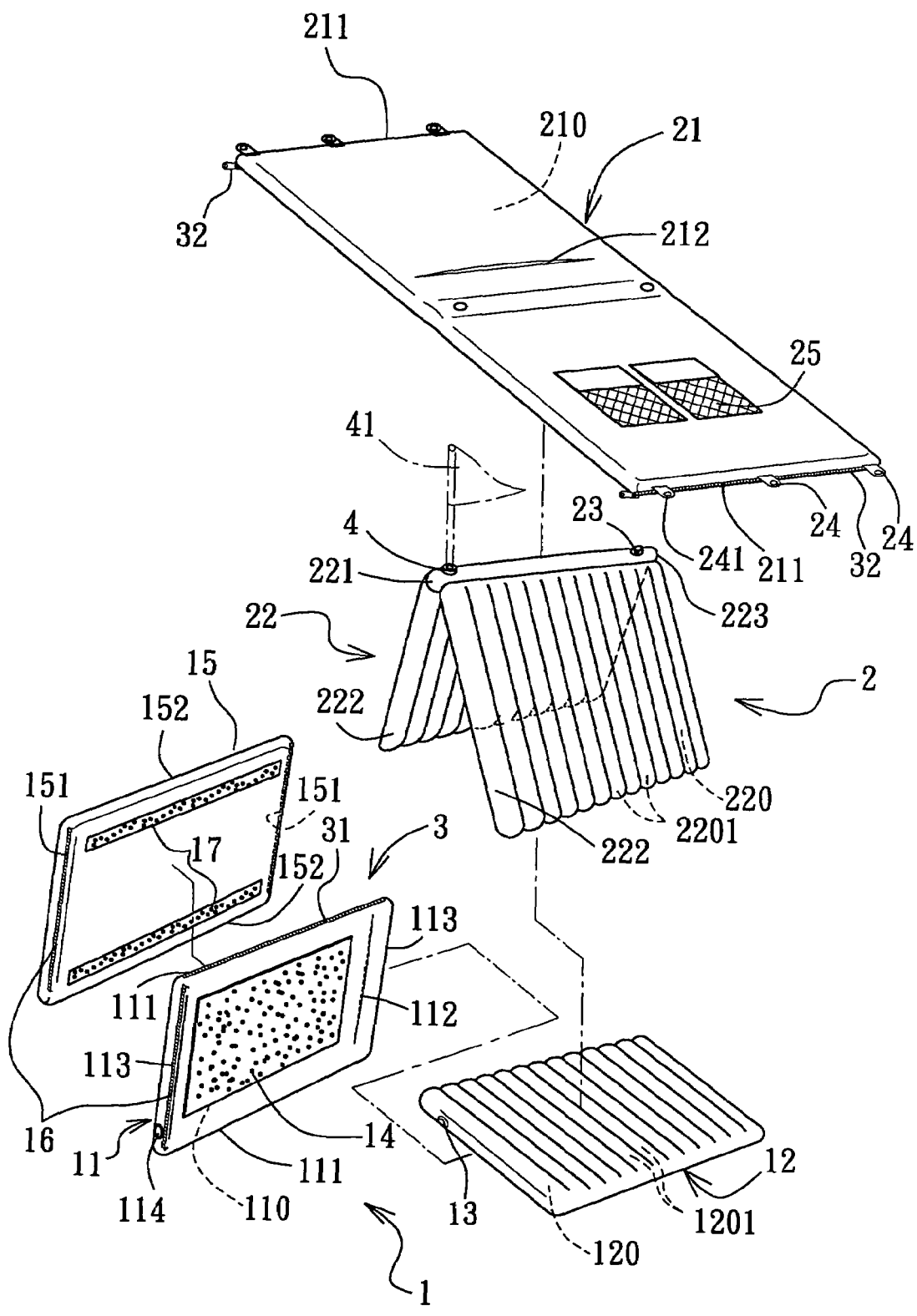
FIG. 1 is an exploded perspective view of the first preferred embodiment of an inflatable pet house module according to the invention.

Before the present invention is described in greater detail, it should be noted that like elements are denoted by the same reference numerals throughout the disclosure.

Figure 2:
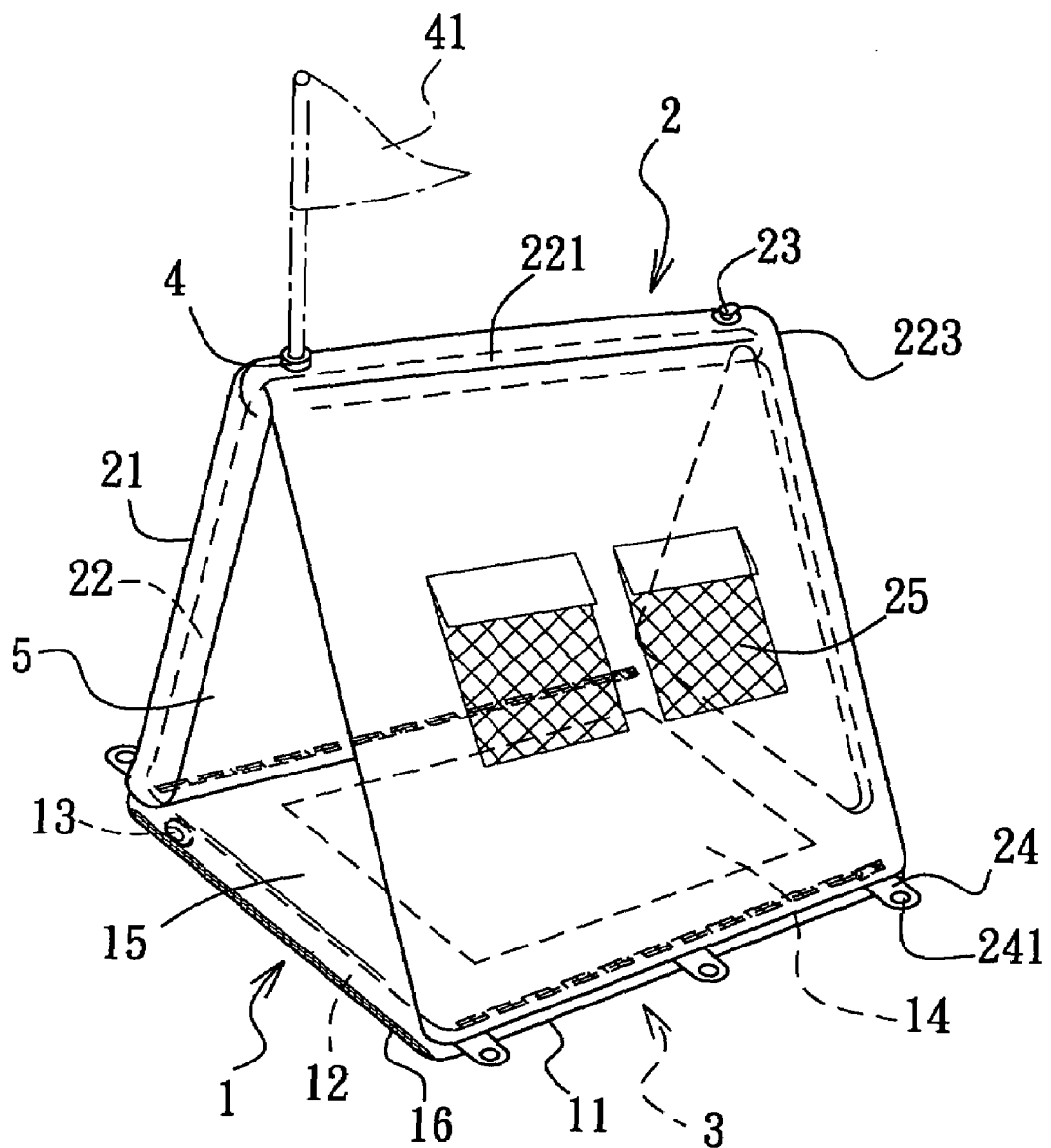
FIG. 2 is an assembled perspective view of the first preferred embodiment in a state of use.

Referring to FIGS. 1 and 2, the first preferred embodiment of an inflatable pet house module according to the present invention is shown to include first and second inflatable units 1, 2, and a coupling unit 3. The first inflatable unit 1 is adapted to be placed on a ground surface, and includes an inflatable mattress 12 and a mattress cover 11, which are substantially rectangular in shape. The inflatable mattress 12 confines a first air inflatable space 120 therein, and is provided with a first valve member 13 for inflating and deflating the inflatable mattress 12. The mattress cover 11 confines a first receiving space 110 for accommodating the inflatable mattress 12 therein, and is formed with a first access opening 112 communicated with the first receiving space 110 such that the inflatable mattress 12 is insertable into the first receiving space 110 through the first access opening 112. The mattress cover 11 has two first lateral edges 111 opposite to each other in a longitudinal direction and spaced apart from each other by a first distance, and two first longitudinal edges 113 opposite to each other in a transverse direction and interconnecting the first lateral edges 111. The mattress cover 11 further has a bottom surface adapted to be in contact with the ground surface. An anti-slip member 14, which is formed from a plastic material, is provided on the bottom surface of the mattress cover 11 to contact the ground surface so as to prevent slippage of the mattress cover 11 relative to the ground surface.

A pad 15, shaped to match the mattress cover 11, is attached removably to a top surface of the mattress cover 11, and has two opposite longitudinal edges 151 corresponding to the first longitudinal edges 113 and connected releasably to the first longitudinal edges 113 by zippers 16. Two adhesive members 17 are provided on a bottom surface of the pad 15 adjacent to two lateral edges 152 of the pad 15 such that the pad 15 can be attached firmly and flatly to the top surface of the mattress cover 11. The pad 15 is formed from a warm, soft fabric material, and can be selectively used depending on weather conditions.

The second inflatable unit 2 is coupled releasably to the first inflatable unit 1, and includes an inflatable canopy body 22 and a canopy cover 21, which are substantially rectangular in shape. The inflatable canopy body 22 confines a second air inflatable space 220 therein, and is provided with a second valve member 23 for inflating and deflating the inflatable canopy body 22. The inflatable canopy body 22 has two longitudinal edges opposite to each other in the transverse direction, and a middle portion 223 having a middle heat-seal line unit that extends between the longitudinal edges in the transverse direction so as to partition the inflatable canopy body 22 into two canopy sections 222 to thereby configure the second air inflatable space 220 into two intercommunicated air inflatable regions. The canopy cover 21 confines a second receiving space 210 for receiving the inflatable canopy body 22 therein, and is formed with a second access opening 212 communicated with the second receiving space 210 such that the inflatable canopy body 22 is insertable into the second receiving space 210 through the second access opening 212. The canopy cover 21 has two second lateral edges 211 opposite to each other in the longitudinal direction and spaced apart from each other by a second distance. The second distance is greater than the first distance.

The coupling unit 3 couples releasably the second lateral edges 211 of the canopy cover 21 to the first lateral edges 111 of the mattress cover 11 such that the inflatable canopy body 22, together with the canopy cover 21, is bendable along the middle heat-seal line unit into an inverted V-shape when inflated so as to place the inflatable canopy body 22 in a standing position where the middle portion 223 is propped up by the canopy sections 222 to thereby enable the first and second inflatable units 1, 2 to cooperatively define a chamber 5 that has two open ends opposite to each other in the transverse direction. In this embodiment, the middle heat-seal unit includes two parallel heat-seal lines that are spaced apart to define an inflatable middle section 221. The inflatable middle section 221 confines an air inflatable middle region communicated with the two air inflatable regions, and will assume a substantially cylindrical shape when the inflatable canopy body 22 is inflated. The second valve member 23 is provided on the inflatable middle section 221.

The mattress cover 11 and the canopy cover 21 are preferably formed from a decorative tough fabric material capable of enduring scratches by dogs, and are provided with holes to permit extension of the respective first and second valve members 13, 23 therethrough so as to facilitate inflation and deflation of the inflatable mattress 12 and the inflatable canopy body 22 received therein, respectively. The mattress cover 11 further has a cover piece 114 to conceal the first valve member 13.

The coupling unit 3 includes a plurality of first connecting members 31 provided respectively on the first lateral edges 11 of the mattress cover 11, and a plurality of second connecting members 32 provided respectively on the second lateral edges 211 of the canopy cover 21 to engage removably and respectively the first connecting members 31. In this embodiment, the first and second connecting members 31, 32 are complementary zipper assemblies, which can be substituted by hook-and-loop fasteners, and the like.

The inflatable pet house module of this invention further includes a flag mounting member 4 disposed on the middle portion 223 of the inflatable canopy body 22, specifically the inflatable middle section 221 of the inflatable canopy body 22 near one end of the chamber 5, for mounting of a flag 41 thereat for identification purposes.

The second inflatable unit 2 further includes a plurality of positioning members 24 extending outwardly from the second lateral edges 211 of the canopy cover 21, respectively. Each of the positioning members 24 is provided with a through hole 241 for passage of a fastener to secure the second inflatable unit 2 on the ground surface. In addition, the second inflatable unit 2 further includes a plurality of pockets 25 provided on the canopy cover 21 for receiving toys or other articles.

Furthermore, the inflatable mattress 12 has a plurality of heat-seal lines extending in the longitudinal direction so as to configure the first air inflatable space 120 into a plurality of intercommunicated first air channels 1201, and each of the canopy sections 222 of the inflatable canopy body 22 has a plurality of heat-seal lines extending in the longitudinal direction so as to configure the respective one of the air inflatable regions into a plurality of intercommunicated second air channels 2201. Due to the provision of the first and second air channels 1201, 2201, the inflatable mattress 12 and the inflatable canopy body 22 can have a corrugated profile with a relatively uniform thickness.

Figure 3:
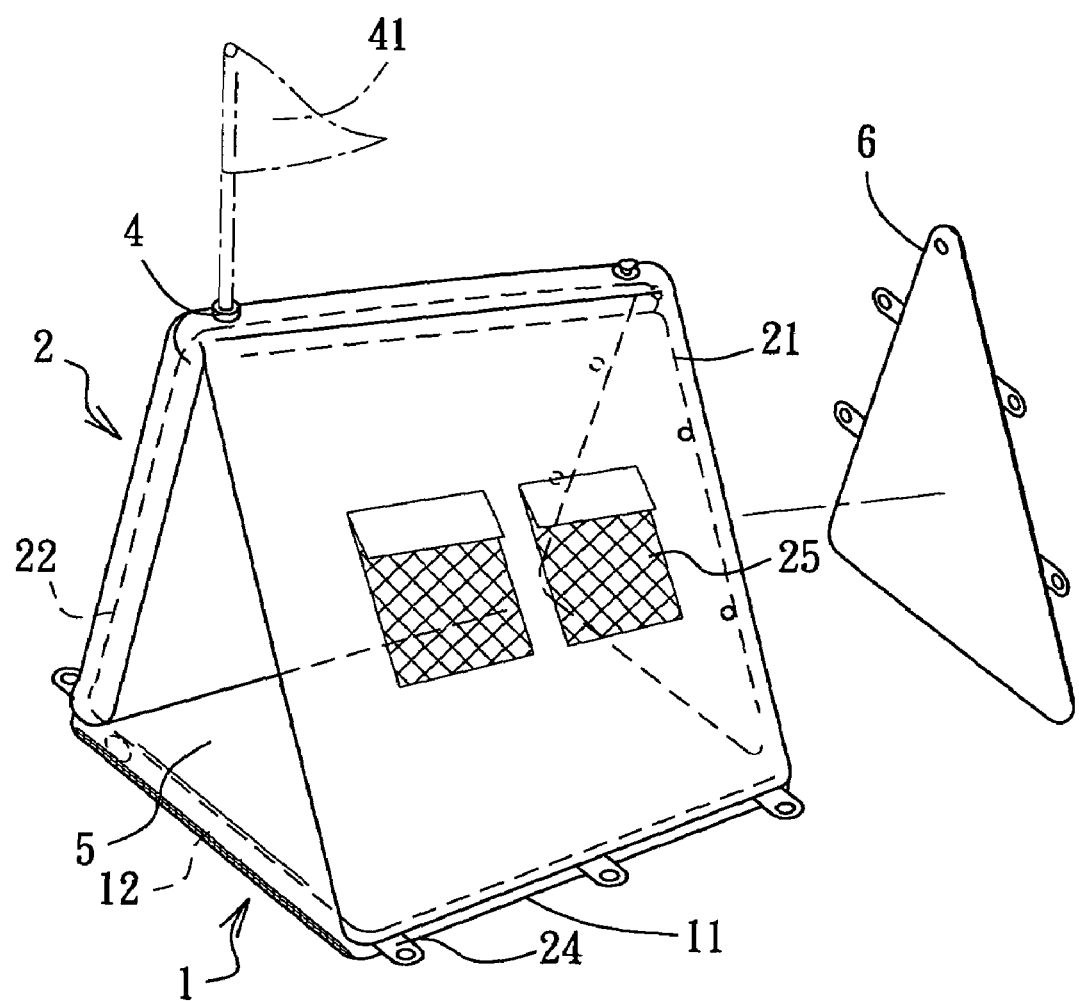
FIG. 3 is a partly exploded perspective view of the second preferred embodiment of an inflatable pet house module according to this invention.
Figure 4:
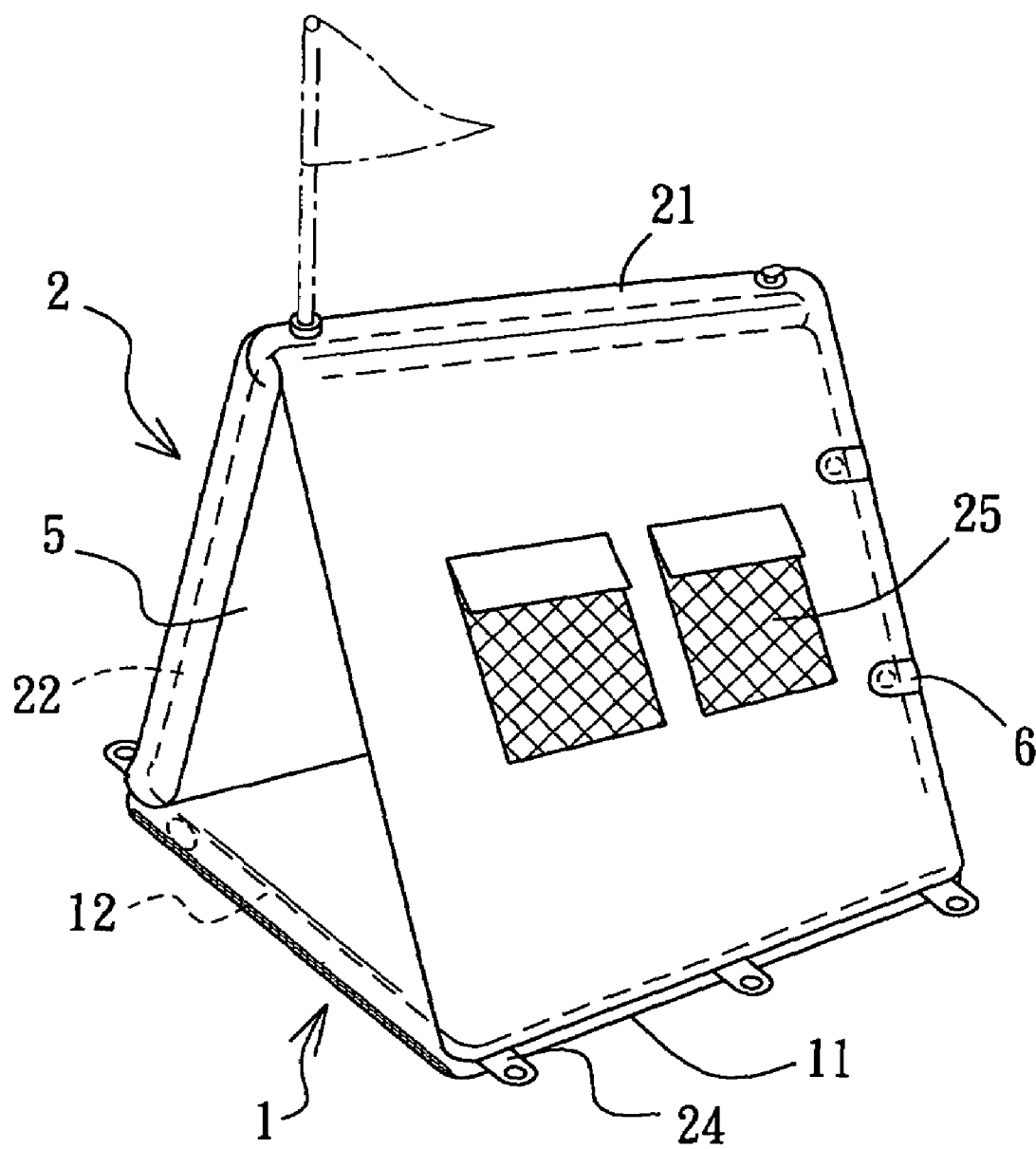
FIG. 4 is an assembled perspective view of the second preferred embodiment in a state of use.

Referring to FIGS. 3 and 4, the second preferred embodiment of an inflatable pet house module according to this invention, which is substantially similar to the previous embodiment, further includes a shielding member 6 connected removably to the canopy cover 21 to close one of the ends of the chamber 5 remote from the flag mounting member 4. The shielding member 6 can be connected to the canopy cover 21 through complementary fasteners, such as zippers, buttons, hook-and-loop fasteners, and the like.

In sum, the inflatable pet house module of this invention can be erected with relative ease, is collapsible to facilitate carrying and storage, and is comfortable for the pet to sleep in. Besides, the mattress and canopy covers 11, 21 are replaceable for variety and for cleaning.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An inflatable pet house module, comprising:
a first inflatable unit adapted to be placed on a ground surface and including an inflatable mattress confining a first air inflatable space therein and provided with a first valve member for inflating and deflating said inflatable mattress, and a mattress cover confining a first receiving space for accommodating said inflatable mattress therein and formed with a first access opening communicated with said first receiving space such that said inflatable mattress is insertable into said first receiving space through said first access opening, said mattress cover having two first lateral edges opposite to each other in a longitudinal direction and spaced apart from each other by a first distance;
a second inflatable unit coupled releasably to said first inflatable unit and including an inflatable canopy body confining a second air inflatable space therein, provided with a second valve member for inflating and deflating said inflatable canopy body, and having two longitudinal edges opposite to each other in a transverse direction, and a middle portion having a middle heat-seal line unit that extends between said longitudinal edges in the transverse direction so as to partition said inflatable canopy body into two canopy sections to thereby configure said second air inflatable space into two intercommunicated air inflatable regions, said middle heat-seal line unit including two parallel heat-seal lines that are spaced apart to define an inflatable middle section, said inflatable middle section confining an air inflatable middle region communicated with said air inflatable regions and assuming a substantially cylindrical shape when said inflatable canopy body is inflated, and a canopy cover confining a second receiving space for receiving said inflatable canopy body therein and formed with a second access opening communicated with said second receiving space such that said inflatable canopy body is insertable into said second receiving space through said second access opening, said canopy cover having two second lateral edges opposite to each other in the longitudinal direction and spaced apart from each other by a second distance, the second distance being greater than the first distance; and a coupling unit for coupling releasably said second lateral edges of said canopy cover to said first lateral edges of said mattress cover such that said inflatable canopy body is bendable along said middle heat-seal line unit when inflated so as to place said inflatable canopy body in a standing position where said middle portion is propped up by said canopy sections to thereby enable said first and second inflatable units to cooperatively define a chamber that has two open ends opposite to each other in the transverse direction, said coupling unit including a plurality of first connecting members provided respectively on said first lateral edges of said mattress cover, and a plurality of second connecting members provided respectively on said second lateral edges of said canopy cover to engage removably and respectively said first connecting members.

2. The inflatable pet house module as claimed in claim 1, further comprising a flag mounting member disposed on said middle portion of said inflatable canopy body for mounting of a flag thereat.

3. The inflatable pet house module as claimed in claim 1, wherein said mattress cover has a bottom surface adapted to be in contact with the ground surface, said first inflatable unit further including an anti-slip member provided on said bottom surface of said mattress cover.

4. The inflatable pet house module as claimed in claim 3, wherein said anti-slip member is formed from a plastic material.

5. The inflatable pet house module as claimed in claim 1, wherein said second inflatable unit further includes a plurality of positioning members extending outwardly from said second lateral edges of said canopy cover, respectively, to secure said second inflatable unit on the ground surface.

6. The inflatable pet house module as claimed in claim 1, wherein said second inflatable unit further includes a pocket provided on said canopy cover.

7. The inflatable pet house module as claimed in claim 1, wherein said first and second connecting members are complementary zipper assemblies.

8. The inflatable pet house module as claimed in claim 1, further comprising a shielding member connected removably to said canopy cover to close one of said ends of said chamber.

9. The inflatable pet house module as claimed in claim 1, wherein said inflatable mattress has a plurality of heat-seal lines extending in the longitudinal direction so as to configure said first air inflatable space into a plurality of intercommunicated first air channels, and each of said canopy sections has a plurality of heat-seal lines extending in the longitudinal direction so as to configure the respective one of said air inflatable regions into a plurality of intercommunicated second air channels.

* * * * *